(12) United States Patent
Zhou et al.

(10) Patent No.: US 11,130,847 B2
(45) Date of Patent: Sep. 28, 2021

(54) EXTERNALLY ACTIVATED SHAPE CHANGING DEVICE

(71) Applicant: Drexel University, Philadelphia, PA (US)

(72) Inventors: Gongyao Zhou, Wilmington, DE (US); Steven K. Leist, Philadelphia, PA (US); Daniel E. Hagaman, Cherry Hill, NJ (US); Haifeng Ji, Cherry Hill, NJ (US)

(73) Assignee: Drexel University, Philadelphia, PA (US)

( * ) Notice: Subject to any disclaimer, the term of this patent is extended or adjusted under 35 U.S.C. 154(b) by 170 days.

(21) Appl. No.: 16/432,664

(22) Filed: Jun. 5, 2019

(65) Prior Publication Data
US 2019/0367692 A1 Dec. 5, 2019

Related U.S. Application Data

(60) Provisional application No. 62/680,833, filed on Jun. 5, 2018.

(51) Int. Cl.
*C08J 5/18* (2006.01)
*B33Y 70/00* (2020.01)

(52) U.S. Cl.
CPC ................ *C08J 5/18* (2013.01); *B33Y 70/00* (2014.12); *C08J 2379/08* (2013.01); *C08J 2483/04* (2013.01)

(58) Field of Classification Search
None
See application file for complete search history.

(56) References Cited

U.S. PATENT DOCUMENTS 5,800,950 A * 9/1998 Hirao ................ G03G 5/02
359/3
6,822,713 B1 * 11/2004 Yaroshchuk ........ G02F 1/13363
349/117

(Continued)

OTHER PUBLICATIONS

Polyimides for Electronics, Lu et al., Advanced Polyimide Materials, Elsevier, Chapter 5, pp. 195-255, 2018 (Year: 2018).*

(Continued)

*Primary Examiner* — Peter A Salamon
(74) *Attorney, Agent, or Firm* — Joseph E. Maenner; Maenner & Associates, LLC (57) ABSTRACT

The present invention provides a 4D printed component that uses the photoisomerization stimulus as a method of activation. Other 4D printing methods use heat, moisture, a combination of heat and stress, and the heat from a light source as methods of activation. The present invention takes advantage of 3D printing capability and adds the capability of providing a printable material that dynamically changes shape over time when exposed to an external stimulus. The invention reduces the number of required 3D printed parts to create a moving object. This characteristic reduces the amount of onboard weight of the 3D printed components by reducing the number of parts required to create motion. The present invention removes the need for onboard sensors, processors, motors, power storage, etc. This characteristic will allow for manufacturing of, inter alia, novel medical devices, automated actuators, packaging, smart textiles, etc.

18 Claims, 7 Drawing Sheets

(56) References Cited

U.S. PATENT DOCUMENTS

| | | | | |
|---|---|---|---|---|
| 2013/0155362 A1* | 6/2013 | Terashita | .......... | G02F 1/133753 |
| | | | | 349/123 |
| 2013/0162920 A1* | 6/2013 | Terashita | .......... | G02F 1/133723 |
| | | | | 349/24 |
| 2014/0227929 A1* | 8/2014 | Miyachi | ............ | G02F 1/133788 |
| | | | | 445/24 |
| 2014/0360860 A1* | 12/2014 | Miyachi | ............ | C08F 122/1006 |
| | | | | 204/157.69 |
| 2017/0160593 A1* | 6/2017 | Cho | ................. | G02F 1/134309 |
| 2019/0367692 A1* | 12/2019 | Zhou | ...................... | B33Y 80/00 |

OTHER PUBLICATIONS

Leist, Steven K. et al. "Current status of 4D printing technology and the potential of light-reactive smart materials as 4D printable materials". Virtual and Physical Prototyping. vol. 11, No. 4, pp. 249-262. Published on-line Jun. 29, 2016.

\* cited by examiner

EXTERNALLY ACTIVATED SHAPE CHANGING DEVICE

CROSS-REFERENCE TO RELATED APPLICATION

The present application claims the benefit of U.S. Provisional Patent Application Ser. No. 62/680,833, filed on Jun. 5, 2018, which is incorporated by reference herein in its entirety.

STATEMENT OF GOVERNMENT INTEREST

This invention was made with government support under Contract No. 1538318 awarded by the National Science Foundation. The government has certain rights in the invention.

BACKGROUND OF THE INVENTION

Field of the Invention

The present invention relates to a three-dimensional (3D) printed material that changes shape when exposed to an external stimulus.

Background of the Invention

Current 3D printing technology can print objects with a multitude of materials; however, these objects are static, geometrically permanent, and not suitable for multi-functional use. 4D printing is an emerging additive manufacturing technology that combines 3D printing with smart materials. The 4D printed objects can change their shape over time (4th dimension) by applying heat, pressure, magnetic field, or moisture to the smart materials.

It would be beneficial to provide 4D printing with a light responsive shape-changing material because light is wireless, easily controllable, and causes a rapid shape change of the smart material.

BRIEF SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present invention provides a 4D printed component that uses the photoisomerization stimulus as a method of activation. Other 4D printing methods use heat, moisture, a combination of heat and stress, and the heat from a light source as methods of activation. The present invention takes advantage of 3D printing capability and adds the capability of providing a printable material that dynamically changes shape over time when exposed to an external stimulus. This characteristic reduces the amount of onboard weight of the 3D printed components by reducing the number of parts required to create motion. The present invention removes the need for onboard sensors, processors, motors, power storage, etc. This characteristic will allow for manufacturing of, inter alia, novel medical devices, automated actuators, packaging, smart textiles, etc.

The present invention provides several polymeric bilayer actuators fabricated by 4D printing that can reversibly change their shape upon exposure to light. The photoactive layer includes a newly synthesized linear azobenzene polymer that is printed onto several different support layers to achieve these bilayer actuators. An investigation of their optical and mechanical properties has allowed us to better understand the photomechanical behavior of these devices. The bilayer actuators provide the ability to design and fabricate more complex devices and extend their use to applications such as unmanned aerial vehicles, artificial muscles, and biomedical drug delivery platforms.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings:

FIG. 3B is a schematic drawing of the device of FIG. 3B with the device reacting to the light source being turned on;

FIG. 3D is a schematic drawing of the device of FIG. 3C with the device reacting to the light source being turned on;

DETAILED DESCRIPTION OF THE INVENTION

In the drawings, like numerals indicate like elements throughout. Certain terminology is used herein for convenience only and is not to be taken as a limitation on the present invention. The terminology includes the words specifically mentioned, derivatives thereof and words of similar import. The embodiments illustrated below are not intended to be exhaustive or to limit the invention to the precise form disclosed. These embodiments are chosen and described to best explain the principle of the invention and its application and practical use and to enable others skilled in the art to best utilize the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

This invention presents 3D printed shape changing components that actuate when exposed to light and reduces the number of required 3D printed parts for creating an actuating mechanism.

A photoisomerizable smart material that responds to ultraviolet (UV) and visible light is used as an additive manufacturing material. The smart material can be defined as a shape memory or shape changing polymer containing photoisomerizable units. The smart material active layer is 3D-printed onto a flexible solid passive layer. These two layers comprise the 3D-printed shape changing device.

The photoisomerizable units in the active layer, alone, change volume when exposed to light. This volume change causes stress to develop in the active layer due to its constraint by the passive layer. The 3D-printed component actuates due to the contraction of the flexible passive layer caused by a stress gradient between the layers. When the light is switched off and a second stimulus is applied, the photoisomerizable units return to their original state, thus the component returns to its original 3D-printed shape. The second stimulus may be heat or light of a different wavelength that returns the material to its original shape. Since the photoisomerizable units can be reversibly switched between states, the actuation of the component is reversible as well.

Current 3D printing material suffers from rigid and static parts that cannot actuate or transform shape right off the print bed. If users desire to make moving parts, such as hinges or actuators, they must assemble multiple parts together after printing. The invention reduces the number of required parts for creating actuating parts by 3D printing a material that can change shape when exposed to light. Post processing of 3D printed parts can still be tedious and time consuming just like machined parts. The 3D printer's bed size is another issue because it limits the number of parts and size of the parts that can be printed in one iteration. Our invention offers a potential solution since it uses a material that can dynamically change shape over time when exposed to an external stimulus after it has been 3D printed.

Light reactive smart materials are used as the 4D printing material because light is a clean power source, capable of being focused, can be remotely controlled, causes rapid shape change, wireless, and can be applied to smart materials at various intensities. The smart material can be 3D printed into complex shapes that can actuate into different states. The inclusion of smart material into 4D printed materials removes the need for complex electrical and mechanical components such as sensors, motors, processors, and power storage. The removal of these components simplifies the design of the products, reduces the weight of the product, and reduces the numbers of chances of a part failing. The invention may find applications in areas of advanced manufacturing, microfabrication, biomedical devices, self-assembling structures, packaging, and smart textiles.

Different blends of a photoisomerable (light reactive) smart material can be developed as a 3D printing material (Fused Deposition Modelling or Extrusion Printing). Different designs can be printed using the light reactive smart material such as cantilevers, multi-hinge components, twisting motion, and 2D designs that can transform materials into 3D objects. The smart material can be dispensed onto a non-reactive polymer film that acts as a flexible passive layer for the 4D printed component. The mechanical properties and shape memory properties of the designs can be evaluated and quantified for scientific reports. Different light sources and power requirements can be assessed to identify the best settings to actuate the 4D printed components.

Figure 1:
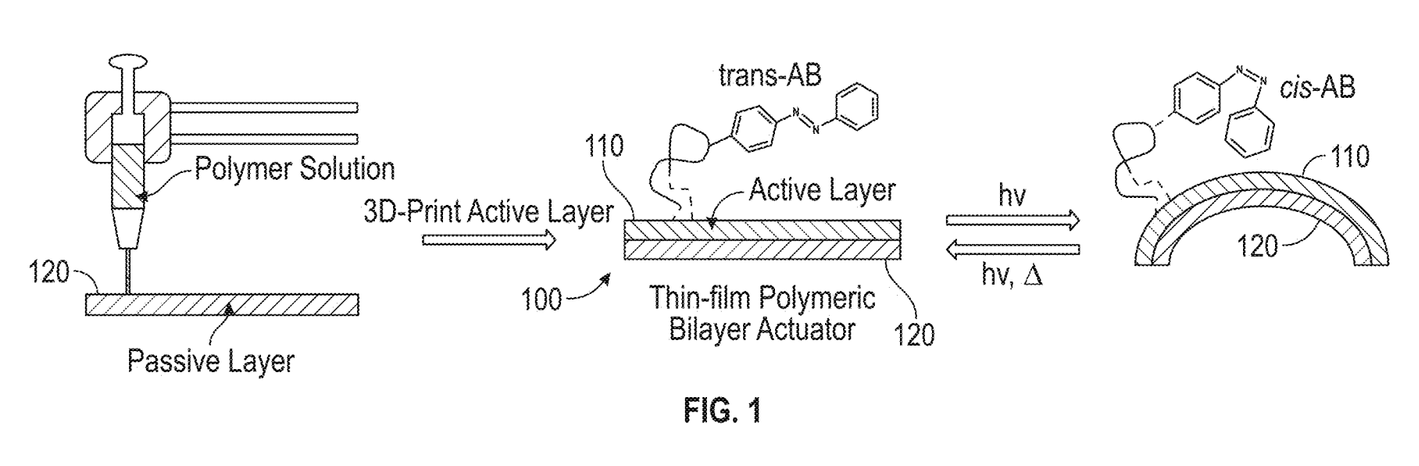
FIG. 1 is a schematic representation of the manufacture and operation of a photoactivated shape changing device according to an exemplary embodiment of the present invention.
Figure 2:
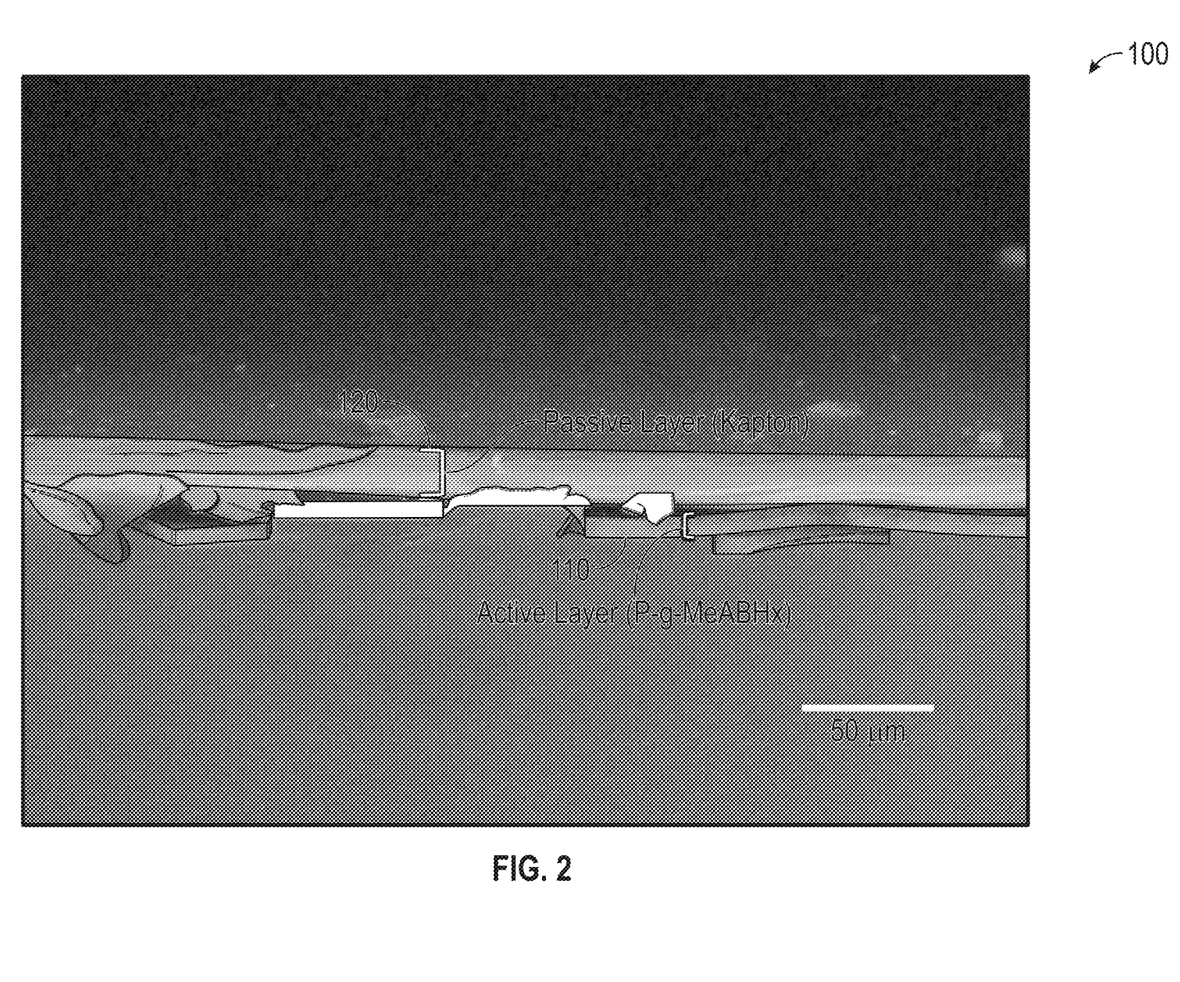
FIG. 2 is an SEM image of a device of the present invention.

In an exemplary embodiment, a 3D printed polymeric bilayer device 100 that requires only light input to achieve a reversible shape change is shown in FIG. 1 and a Scanning Electron Microscope ("SEM") image of device 100 is shown in FIG. 2. Device 100 can be an actuator or other device that is desired to move or transform when exposed to a desired wavelength of light. In an exemplary embodiment, a first layer 110 includes a photoactive poly(siloxane) containing pendant azobenzene (AB) group, known as the active layer. A second layer 120, known as the passive layer, includes a polyimide thin film, such as Kapton®. Polyimide thin films are used as second layer 120 due to the fact that such material is flexible, inert to most organic solvents, and have desirable mechanical properties. Bilayers 110, 120 are fabricated in a single step by printing active layer 110 onto passive layer 120, which has previously been provided in a desired shape.

Irradiating the layers 110, 120 with the appropriate wavelength of light causes a trans-cis isomerization of azobenzene ("AB") molecules in active layer 110. Due to size differences of the AB isomers, the isomerization requires a free volume increase of the polymer matrix, which results in an overall volume expansion of active layer 110. Under the correct conditions, this photoinduced volume expansion forms a strain gradient between the active layer 110 and passive layer 120 large enough to deform device 100. The cis-trans isomerization returns the device 100 to its original shape and removes the strain gradient, making the shape change reversible.

In such bilayer device 100, the shape change relies on the volume change of the active layer 100. While the overall volume change of active layer 110 can be small, such volume change can be amplified into large deformations by means of the configuration of bilayer device 100.

In an exemplary embodiment, linear polymers that are soluble in common organic solvents and can be printed from solution via syringe via 3D printing are used. Passive layer 120 uses a material with a larger modulus than prior art hydrogels or elastomers used in 4D printing that is capable of performing more mechanical work than a comparable actuator with a lower modulus passive layer. Also, the inventive light-driven device 100 uses a stimulus that is superior to prior art stimuli used in 4D printing, such as water or thermomechanics. The shape change of device 100 is near-instantaneous.

For active layer 110, liquid crystal elastomers ("LCEs") can be candidates for applications such as soft actuators and artificial muscles. LCEs are formed from a lightly cross-linked polymeric elastomer portion and a liquid crystalline ("LC") portion that can be in the main chain of the polymer, or alternatively, attached to the main chain as a side group. The unique property that such a material possess is its ability to reversibly change shape upon exposure to external stimuli, such as light, temperature, and electric field. LCEs that change their shape upon exposure to light contain a photosensitive dye as the mesogen in the LC portion. An exemplary dye used in this LCE is an azobenzene-based dye, although those skilled in the art will recognize that other dyes, such as spiropyran and coumarin can be used.

Before irradiation with light, the polymer chains in photoactive LCEs adopt an extended conformation and some degree of chain anisotropy due to the alignment of the dye molecules. The magnitude of the anisotropy is variable from system to system, because the anisotropy is strongly dependent on the overall LCE architecture and the method of alignment used during synthesis. When the LCE is irradiated, the AB dye absorbs light and undergoes a trans-to-cis isomerization. This isomerization induces an isothermal phase change from an initially ordered LC phase to a disordered isotropic phase where the mesogens are no longer aligned and the polymer chains adopt a random coil configuration. This large scale macromolecular motion is responsible for the shape change in the LCEs. The original shape can be recovered by irradiating the LCE with the appropriate wavelength of light to induce the cis-to-trans isomerization of the dye molecule. Usually, the cis isomer of the dye can be obtained by irradiating with UV light and the trans isomer can be recovered with visible light. Since the cis-to-trans isomerization can be induced by both heat and light, heating the LCE above its $T_g$ is another way to recover its original shape.

A feature of AB is that multiple properties of the molecule, such as shape, dipole moment, and light absorption are significantly altered by the trans-cis isomerization. This feature has led to the extensive use of AB in applications such as photochromic devices, molecular machines, and holographic gratings.

The absorption spectrum of trans-AB includes two separate bands in the UV-vis region. The band appearing at $\lambda$-max of ~320 nm (UV) is due to the $\pi$–$\pi$*(S2←S0) transition of trans-AB and is the stronger of the two bands having an extinction coefficient of ~22,000 L/mol/cm. The band appearing at $\lambda$-max of ~450 nm (Vis) is due to an n–$\pi$*(S1←S0) transition of trans-AB. This band is very weak (~400 L/mol/cm), because it is a symmetry-forbidden band involving the excitation of the lone pair of electrons on either azo nitrogen atom. The photoisomerization of trans-AB to cis-AB can be caused by excitation to either the S1 or S2 state. The UV band ($\pi$–$\pi$*) of cis-AB appears at $\lambda$-max of ~270 nm and the visible band (n–$\pi$*) appears at $\lambda$-max of ~450 nm. In cis-AB the n–$\pi$* is no longer symmetry forbidden, and therefore is more intense than in the trans-AB isomer, with an extinction coefficient of ~1500 L/mol/cm. The trans-AB is the more thermodynamically favored of the two isomers, so the cis-trans isomerization can be induced by heating or by irradiation with light having wavelengths greater than ~500 nm.

Active layer 110 includes linear poly(siloxane)s containing pendant AB groups to serve as the active layer materials. An AB molecule is attached to the backbone silicon atoms of polymethylhydrosiloxane (PMHS) by means of known hydrosilylation chemistry. A grafting density of AB of about 0.84 is provided.

The polymer for active layer 110 can be polymethylhydrosiloxane-g-(4-methoxy-4'-(hexyloxy)azobenzene)(P-g-MeABHx). The glass transition temperature ($T_g$) for P-g-MeABHx is about 26 degrees Celsius, which is near room temperature. Polymer segment mobility is largely restricted below $T_g$ and the overall volume change from the trans-cis isomerization would be decreased if the active layer 110 polymers had higher $T_g$ values. This allows operation of device 100 with only light as the stimulus under ambient conditions, whereas LCEs possessing $T_g$ values around 80 degrees Celsius require multiple stimuli (heat and light) because light alone is insufficient to cause a shape change.

Figure 3A:
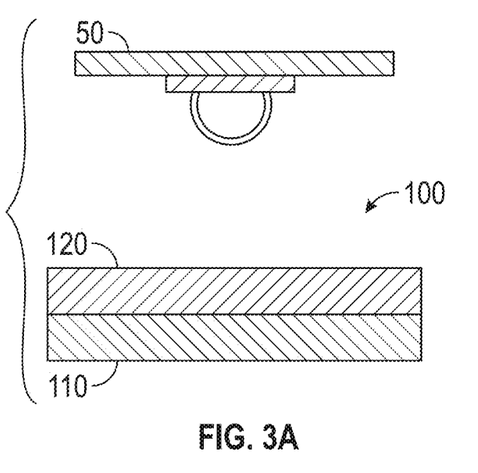
FIG. 3A is a schematic drawing of a device according to the present invention with the active layer proximate to a turned off light source.
Figure 3B:
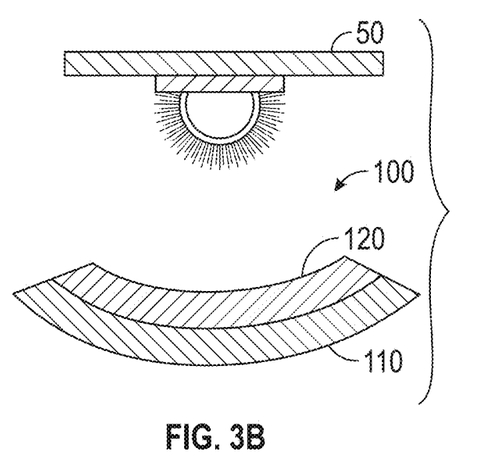
Figure 3C:
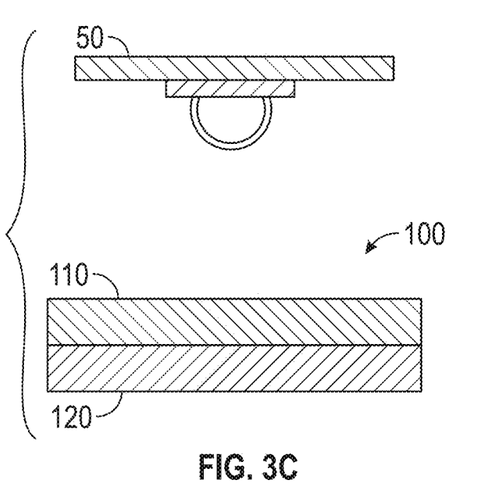
FIG. 3C is a schematic drawing of the device according to the present invention with the active layer distal to a turned off light source.
Figure 3D:
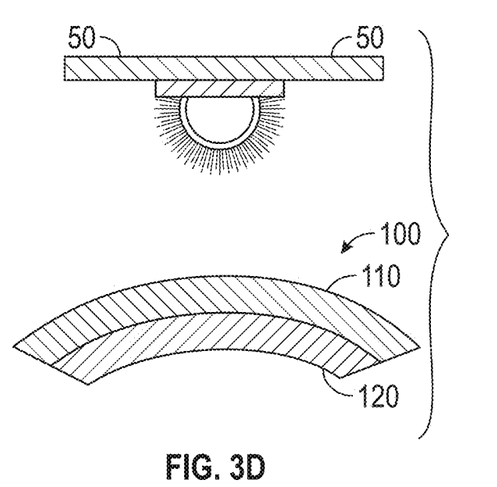

The displacement of bilayer device 100 is known to depend on the thickness ratio between active layer 110 and passive layer 120. In an exemplary embodiment, shown in FIGS. 3A-3D, active layer 110 of a P-g-MeABHx/Kapton bilayer device 100 is proximate to a light source 50. When the light source was switched on, device 100 immediately bent away from light source 50, as shown from FIG. 3A to FIG. 3B. As shown in FIGS. 3C and 3D, device 100 has been flipped over, with active layer 110 being distal from light source 50. With the light from light source 50 passing through passive layer 120 first, active layer 110 bent toward the light source 50. Depending on the placement of light source 50 relative to device 100, the layers 110, 120 either bent toward or away from light source 50, but device 100 always transformed into the same shape. The expansion of active layer 110 along the long axis of device 100 is responsible for the shape change of device 100. The shape-change of device 100 is independent of which side active layer 110 is irradiated with light source 50, since the expansion is always in the same direction. This is quite different from prior art light-activated LCE thin films, which typically bend toward the light source.

In an exemplary embodiment, with active layer 110 having a thickness of about 8 microns and passive layer 120 having a thickness of about 25 microns, with a 442 nm blue light having a power of about 100 mW/cm$^2$ placed about 10 mm from device 100, the maximum bending angle of device 100 was about 35 degrees. Within about 5 seconds of light source 50 being turned on, device 100 reached maximum bending angle. When light source 50 was switched off, it took about 10 seconds for device 100 to return to its original position. After multiple cycles, device 100 showed no signs of fatigue and for each cycle, a maximum deflection angle of about 35 degrees was achieved.

In an alternative embodiment, other materials can be used to form a 4D shape changing device and can convert from one shape to another by the application of heat Poly(lactic) Acid (PLA) is a common FDM material that possesses shape changing and shape memory properties. PLA can stand alone or be combined with other materials such as textiles or fabrics. The textile industry has been displaying increasing interest into adaptable materials and technological state-of-the-art textiles. Shape memory materials (SMM) are materials that sense a change in temperature in their environment and change their physical properties, such as a change in shape. One method of creating smart textiles is combining yarns with shape memory alloys ("SMAs") or with shape memory polymers ("SMPs") to form smart woven textiles fabrics. Typically, SMPs used in smart textile research are polyurethanes and polyurethane blends.

These smart woven textiles would have potential use for interior applications that require minimal human interaction. The materials sense and react to the environment's temperature that causes the materials to expand or contract. As an example, a smart fabric being used as window blinds could expand and lower when exposed to sun, thus reducing the amount of sunlight in a room.

FDM printed PLA possesses shape changing properties, which are caused by the strain generated during the 3D printing process when contracted strain is generated within the PLA with higher printing speeds. Thus, the material shrinks when exposed to temperatures above its Tg, causing the shape change. PLA can be 3D printed onto materials with different coefficient of thermal expansion, such as paper, and create light weight 3D structures from 2D sheets using the thermal stimulus shape change. This methodology can be used for pattern transformation in heat shrinkable materials and simplify the manufacturing process of shape memory materials suited for microstructures.

In order to obtain the relationships between the printing properties of the PLA and the shape fixing properties, different thicknesses of PLA cantilevers ranging from 800 µm, 1000 µm, and 1200 µm were printed. The material used in the printer was 1.75 mm in diameter PLA filament from Flashforge. The PLA possessed a glass transition temperature ($T_g$) around 58-60 degrees Celsius and a melting temperature ($T_m$) at 150-220 degrees Celsius. During printing, a permanent shape was established because the ordered crystalline structure of PLA is printed above its $T_m$ and cooled to room temperature (below its $T_g$). During the programming stage, temporary shapes can be created when a stress is applied to the PLA when the PLA is heated above its Tg, fixed in that position, and maintained that stress/strain as the material cools. The stress is removed once the material fully cools to room temperature and the temporary shape is maintained.

Cyclic mechanical tests were performed to quantify the shape memory of the post printed PLA. During these tests, the strain fixity rate ($R_f$) was calculated. $R_f$ measures the materials' ability to hold a temporary shape after the material has been programmed (Eq. 1). During each number of cycles (N), the applied mechanical strain (εm) and the temporary strain after fixing, (εu(N)) are used to calculate $R_f$. However, during experiments the final bending angle of the cantilever (θf) compared to the bending angle during programming or shape fixing (θf) was measured (Eq. 2).

$$R_f = \varepsilon_f(N)\varepsilon m \times 100\% \quad \text{(Eq. 1)}$$

$$R_f = \theta_f(N)\theta m \times 100\% \quad \text{(Eq. 2)}$$

Example

Figure 4A:
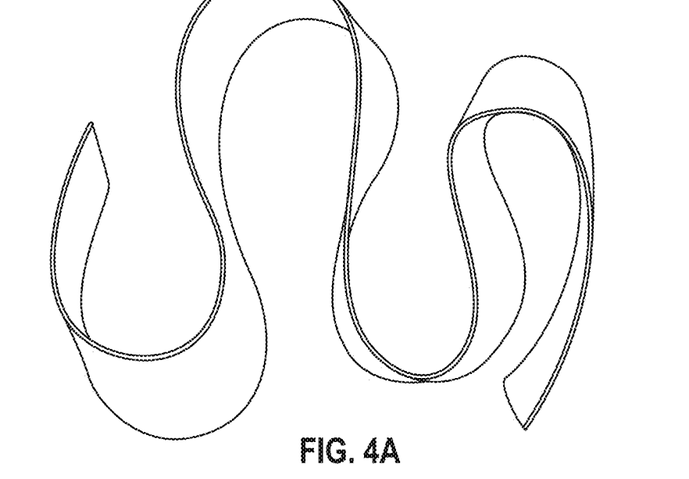
FIG. 4A is a photo of a temporary compressed shape of a four-curved spline after it has been heated to 70° C. and then cooled to room temperature.
Figure 4B:
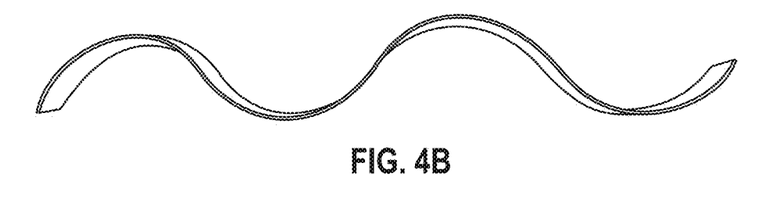
FIG. 4B. is a photo of the compressed spline of FIG. 4A extending to its permanent shape after it is reheated to 70° C.
Figure 4C:
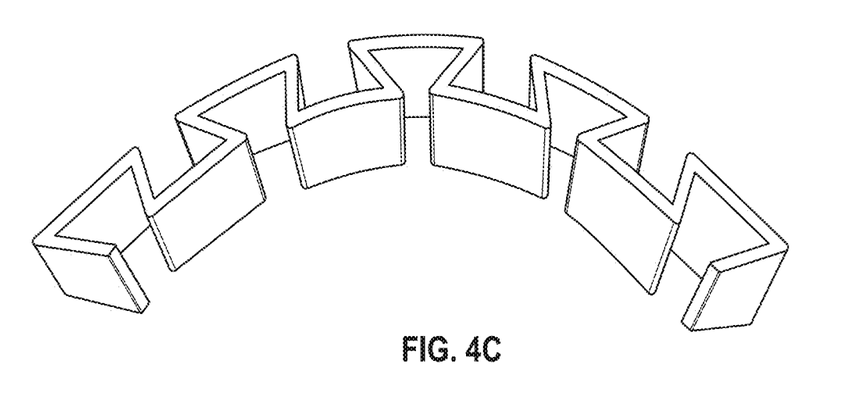
FIG. 4C is a photo of an arm that can be bent when heated then cooled to room temperature.
Figure 4D:
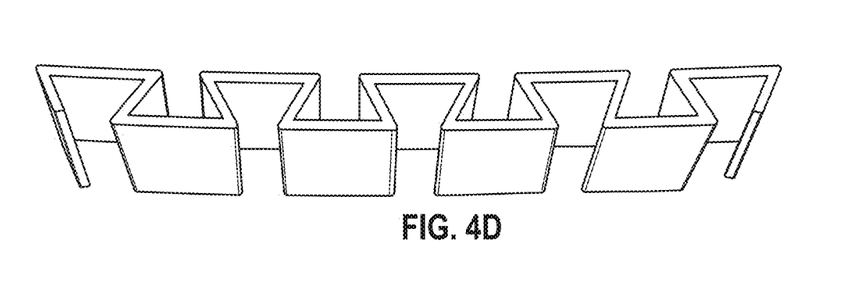
FIG. 4D is a photo of the arm of FIG. 4C returned to its permanent straight shape when reheated to 70° C.
Figure 5A:
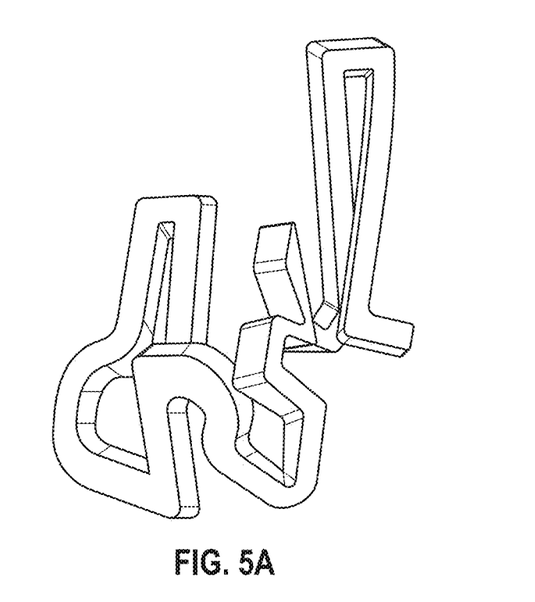
FIG. 5A is a photo of a compressed "drxl" logo after it has been heated above its glass transition temperature (70° C.) then cooled.
Figure 5B:
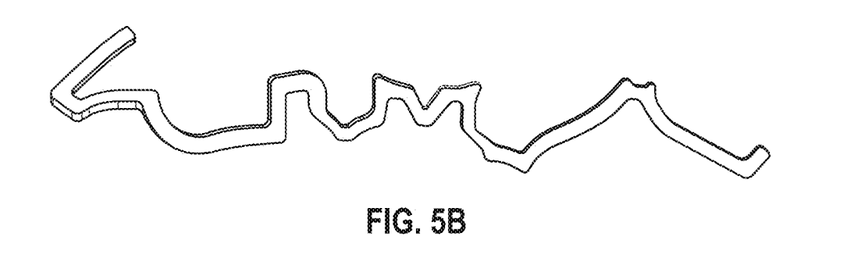
FIG. 5B is a photo of an extended "drxl" logo that is cooled
Figure 5C:
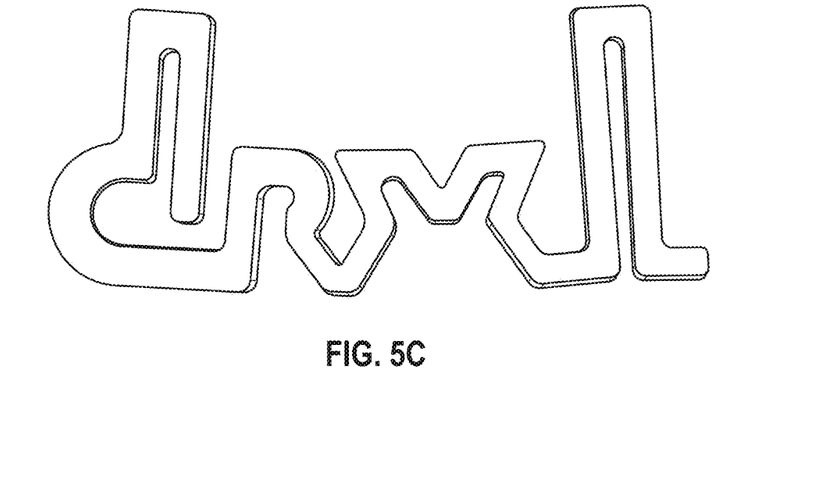
FIG. 5C is a photo of both shapes of FIGS. 5A and 5B returned to the permanent "drxl" shape when reheated to 70° C.

Different designs and concepts were 3D printed to test the shape memory capabilities of PLA. A spline with four curves, 68.39 mm in length, 10 mm wide, and a thickness of 0.50 mm was 3D printed on the 3D printer. The designs were placed into a pool of water at 70° C. for 60 seconds and compressed within the water. After the spline was compressed, it is removed from the pool and allowed to cool to room temperature, which caused the compressed spline to harden (FIG. 4A). The spline maintained its temporary compressed shape under $T_g$. The compressed spline quickly expands back to its original shape once it is returned to the 70° C. pool of water (FIG. 4B). Alternate designs of PLA 4D printing were tested using the same method. In other examples, a 3D printed "arm" can be bent in the user's desired direction and return to the permanent straight shape (FIGS. 4C and 4D). In another test, a "drxl" logo can be compressed or extended when heated and return to the "drxl" symbol when heated above its transition temperature, (FIGS. 5A-5C). All models tested, take seconds to return to their permanent shapes when heated above their $T_g$.

Since PLA possesses shape memory properties, poly-l-lactic acid ("PLLA") was combined with PLA to determine the resulting shape memory structure. In a first embodiment using PLA, the PLA material is the only material used during the process and 3D printed directly onto a print bed. In a second embodiment using PLA, The PLA material is 3D printed onto a nylon fabric. The nylon fabric used for the textile printing is Solid Power Mesh Fabric Nylon Spandex made up of 90% nylon and 10% spandex. The nylon fabric is cut into 40 mm×40 mm squares and measures at 0.26 mm in thickness. Double sided tape is placed onto the print bed and the cut nylon fabric is placed onto the tape for better adhesion to the build plate. Finally, computer printing file is uploaded and a part is 3D printed onto the nylon fabric. The printing speed was set to 100 mm/s, the bed temperature was set to room temperature, and the nozzle temperature was set to 230° C. for all test prints.

Figure 6A:
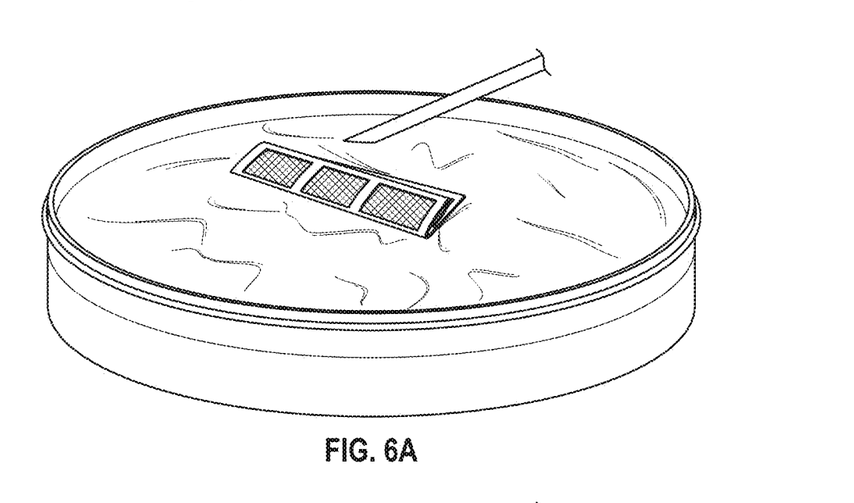
FIG. 6A is a photo of PLA and nylon fabric combo that was heated to 70° C. and rolled into a cylinder, then cooled.
Figure 6B:
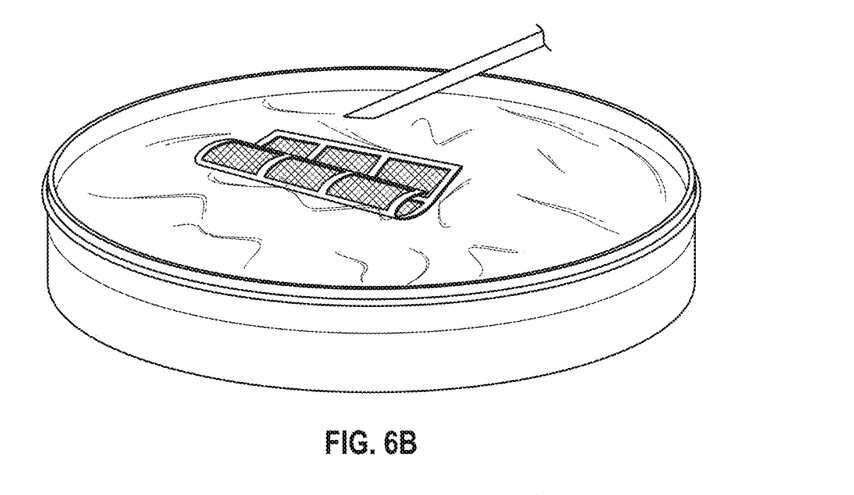
FIG. 6B is a photo of the PLA nylon cylinder of FIG. 6A unfolding into its permanent flat shape when reheated in the 70° C. pool of water.
Figure 6C:
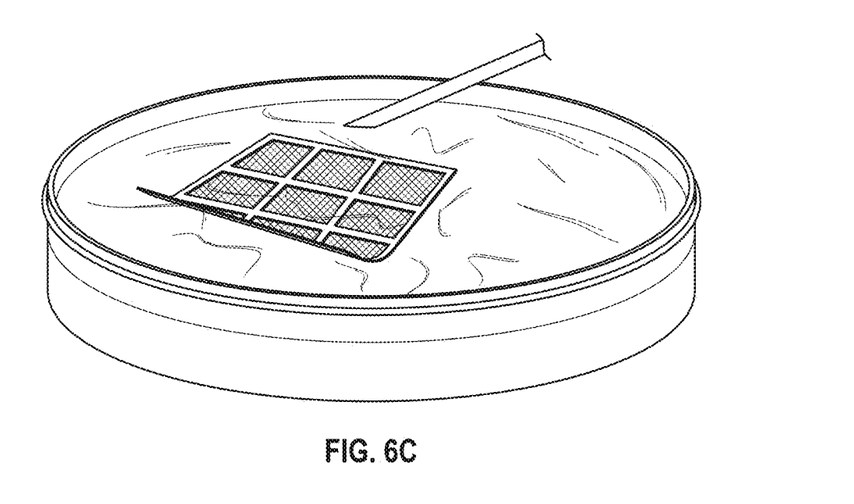
FIG. 6C is a photo of the PLA nylon cylinder of FIG. 6A fully unfolded into its permanent flat shape.

A grid structure that was 3D printed onto the nylon material was placed into heated water at 70° C. and rolled into a cylinder. Once the material was rolled into the desired shape, the component was removed from the heated pool and allowed to cool to room temperature. At room temperature, the material remains stiff and maintains its temporary cylindrical shape; however, the cylinder unravels to the permanent flat shape when the cylinder is returned to the heated water above its $T_g$ at 70~80° C. (FIGS. 6A-6C).

Figure 7A:
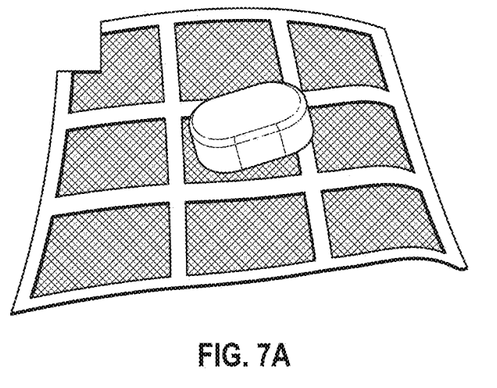
FIG. 7A is a photo of a magnetic stir bar placed in the center of the PLA nylon fabric.
Figure 7B:
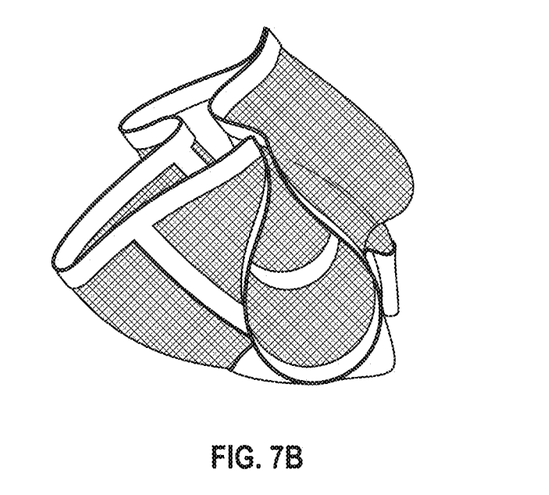
FIG. 7B is a photo of the PLA nylon fabric of FIG. 7A having been heated to 70° C. and encapsulating the stir bar, then removed from the heated water to cool to room temperature and maintaining its shape.
Figure 7C:
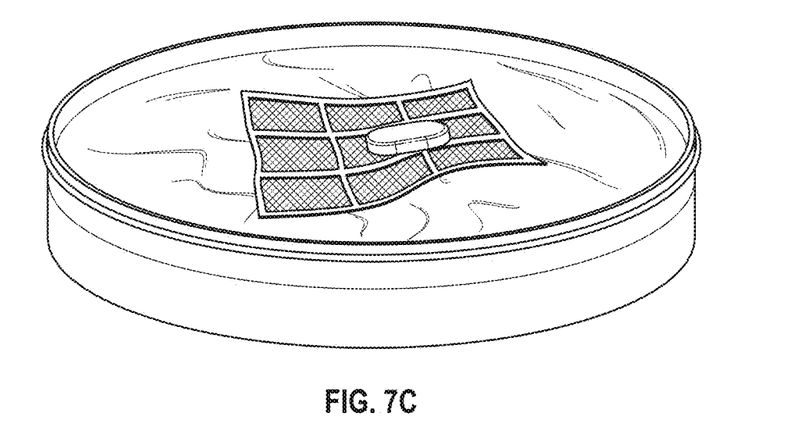
FIG. 7C is a photo of the PLA nylon fabric of FIG. 7B having unraveled and releasing the stir bar when the PLA nylon fabric is returned to the heated bath.

Next, the nylon fabric with a grid made from PLA 3D printed onto its surface was used for the concept of encapsulation and release of an object when exposed to heated environments. In this case, a magnetic stir bar was placed in the center of the fabric (FIG. 7A), but the PLA fabric combination cannot be wrapped around the stir bar due to it being stiff at temperatures under 60° C. The PLA fabric and stir bar were submerged into 70° C. water for 60 seconds. The corners of the fabric were wrapped around the stir bar and the entire piece is removed from the heated water. The material cools to room temperature and becomes stiff, ensnaring the stir bar (FIG. 7B). The PLA fabric mesh is returned to the 70° C. water in order to release the stir bar (FIG. 7C).

The concept of smart materials combined with nylon textiles displays the possibility of using smart textiles for encapsulation and controlled release in response to its surrounding environment. The nylon fabric in the experiments serves more as a structure and non-active material, while the PLA serves as the smart material. The research presents a proof-of-concept of 4D printed smart textiles and their future applications. It is observed that the smart textiles could be modified into custom shapes and 2D flat textiles could be transformed into temporary 3D objects that maintain those shapes at room temperature. This may be promising for clothing that reacts to extreme environments and release products that may protect the wearers from dangerous environments. Also, the combination of smart materials with non-reactive textiles as structural materials reduces the need for additional 3D printing material, which may be more expensive.

The shape changing smart textiles could be used for aesthetic reasons or compact packing of supplies and unfolding at their final destination. The combination of textiles with smart materials may allow wearers of clothing to customize and mold clothes to their personal designs and body types. This development could lead to clothing that reacts with the surrounding environment or to the wearer's body temperature. The same piece of clothing could be used for insulating the wearer or ventilating them. Smart textiles may find uses in the biomedical field. Smart fabrics that can be infused with medicine can be used for different biomedical applications that mold to different body parts and persons with different body types. Such applications would be ideal for burn victims or patients that have suffered bone fractures, where the materials can be soft when applied to the patient then harden after the medical procedure. The removal of the cast or skin prove to be easier than current methods by reheating to the smart material above its $T_g$ to soften it and allow for unraveling.

A Ph.D. thesis by inventor Steven Leist is attached hereto as an Appendix and is incorporated herein in its entirety by reference.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A photoactivated shape changing device comprising:
   a first layer including a photoactive poly(siloxane) containing pendant azobenzene group; and
   a second layer including a polyimide film, the second layer being attached to the first layer,
   wherein the first layer has a grafting density with the second layer of about 0.84.

2. The photoactivated shape changing device according to claim 1, wherein the first layer is an active layer and the second layer is a passive layer.

3. The photoactive shape changing device according to claim 1, wherein the device has a first shape and, when exposed to UV light, the device transforms into a second shape.

4. The photoactive shape changing device according to claim 3, wherein, when the first layer is placed proximate to the light source, the device bends away from the UV light.

5. The photoactive shape changing device according to claim 4, wherein, when the first layer is placed distal from the light source, the device bends toward the UV light.

6. The photoactive shape changing device according to claim 3, wherein only the UV light is used to change from the first shape to the second shape.

7. The photoactive shape changing device according to claim 3, wherein, when the UV light is removed, the device reverts to the first shape.

8. A photoactivated shape changing device comprising:
   a first layer including a photoactive poly(siloxane) containing pendant azobenzene group; and
   a second layer including a polyimide film, the second layer being attached to the first layer,
   wherein the device comprises an actuator.

9. The photoactive shape changing device according to claim 8, wherein the photoactive poly(siloxane) containing pendant azobenzene group comprises polymethylhydrosiloxane-g-(4-methoxy-4'-(hexyloxy)azobenzene).

10. A photoactive shape changing device comprising:
    a photoactive first layer; and
    a non-photoactive passive second layer attached to the first layer,
    wherein the first layer has a glass transition temperature of about 26 degrees Celsius.

11. The photoactive shape changing device according to claim 10, wherein the first layer is only activated by UV light.

12. The photoactive shape changing device according to claim 11, wherein the device comprises a first shape in the absence of the UV light and the device converts to a second shape in the presence of the UV light.

13. The photoactive shape changing device according to claim 12, wherein, when the UV light is removed, the device reverts to the first shape.

14. The photoactive shape changing device according to claim 11, wherein, when the first layer is placed proximate to the UV light, the device forms the second shape.

15. The photoactive shape changing device according to claim 14, wherein, when the first layer is placed distal from the UV light, the device forms the second shape.

16. The photoactive shape changing device according to claim 10, wherein the second layer comprises a polyimide film.

17. The photoactive shape changing device according to claim 16, wherein the first layer comprises a poly(siloxane) containing pendant azobenzene group.

18. The photoactive shape changing device according to claim 8, wherein, when the device is in the absence of a UV light, the device has a first shape, when the device is exposed to a UV light, the device converts to a second shape and, when the UV light is removed, the device reverts to the first shape.

* * * * *